US012779755B2

(12) United States Patent
Nishizawa et al.

(10) Patent No.: US 12,779,755 B2
(45) Date of Patent: Nov. 3, 2026

(54) SAFETY COVER AND VERTICAL INJECTION MOLDING MACHINE

(71) Applicant: NISSEI PLASTIC INDUSTRIAL CO., LTD., Nagano (JP)

(72) Inventors: Kazuhiko Nishizawa, Nagano (JP); Hajime Ueno, Nagano (JP); Masayuki Miyajima, Nagano (JP)

(73) Assignee: NISSEI PLASTIC INDUSTRIAL CO., LTD., Nagano (JP)

( * ) Notice: Subject to any disclaimer, the term of this patent is extended or adjusted under 35 U.S.C. 154(b) by 77 days.

(21) Appl. No.: 19/042,227

(22) Filed: Jan. 31, 2025

(65) Prior Publication Data

US 2025/0256445 A1 Aug. 14, 2025

(30) Foreign Application Priority Data

Feb. 14, 2024 (JP) ................................ 2024-020628

(51) Int. Cl.
*B29C 45/84* (2006.01)
*B29C 45/06* (2006.01)
*B29C 45/64* (2006.01)

(52) U.S. Cl.
CPC .............. *B29C 45/84* (2013.01); *B29C 45/06* (2013.01); *B29C 45/64* (2013.01)

(58) Field of Classification Search
CPC .......... B29C 45/84; B29C 45/06; B29C 45/64
See application file for complete search history.

(56) References Cited

U.S. PATENT DOCUMENTS

| | | | | |
|---|---|---|---|---|
| 12,649,271 | B2 * | 6/2026 | Gehring | B29C 45/78 |
| 2019/0001542 | A1 * | 1/2019 | Tanemura | B29C 45/64 |
| 2021/0229329 | A1 * | 7/2021 | Petitjean | B29C 45/26 |
| 2024/0316850 | A1 * | 9/2024 | Horie | B29C 45/7686 |

FOREIGN PATENT DOCUMENTS

| | | | |
|---|---|---|---|
| CN | 203739178 | U | 7/2014 |
| JP | H09-155944 | A | 6/1997 |
| JP | 2019-177683 | A | 10/2019 |

OTHER PUBLICATIONS

Extended European Search Report dated Jul. 15, 2025, issued in corresponding European Patent Application No. 25152830.3.

* cited by examiner

*Primary Examiner* — Nahida Sultana
(74) *Attorney, Agent, or Firm* — Morgan, Lewis & Bockius LLP

(57) ABSTRACT

Provided are a safety cover with good maintainability and an injection molding machine including the safety cover. The safety cover includes: a lower cover attached to a movable plate where a lower mold is installed; and an upper cover provided above the lower cover. The upper cover includes a fixed cover, a lifting cover that is attached to the fixed cover so as to be movable in an up-down direction, and a holding device configured to hold the lifting cover in a predetermined position in the up-down direction. The safety cover further includes a lifting device configured to move the lifting cover up and down.

4 Claims, 5 Drawing Sheets

[FIG. 1]
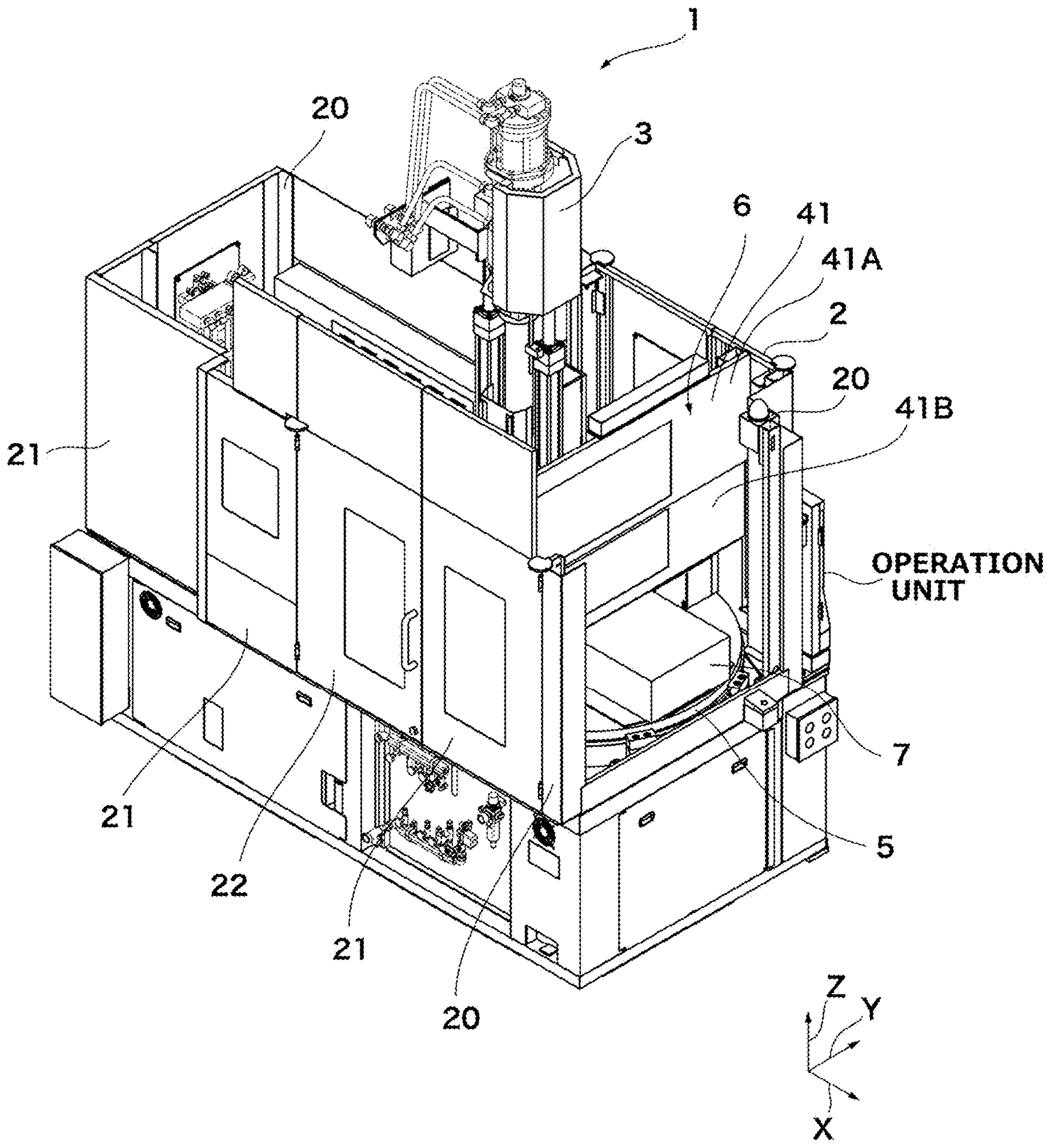

[FIG. 2]
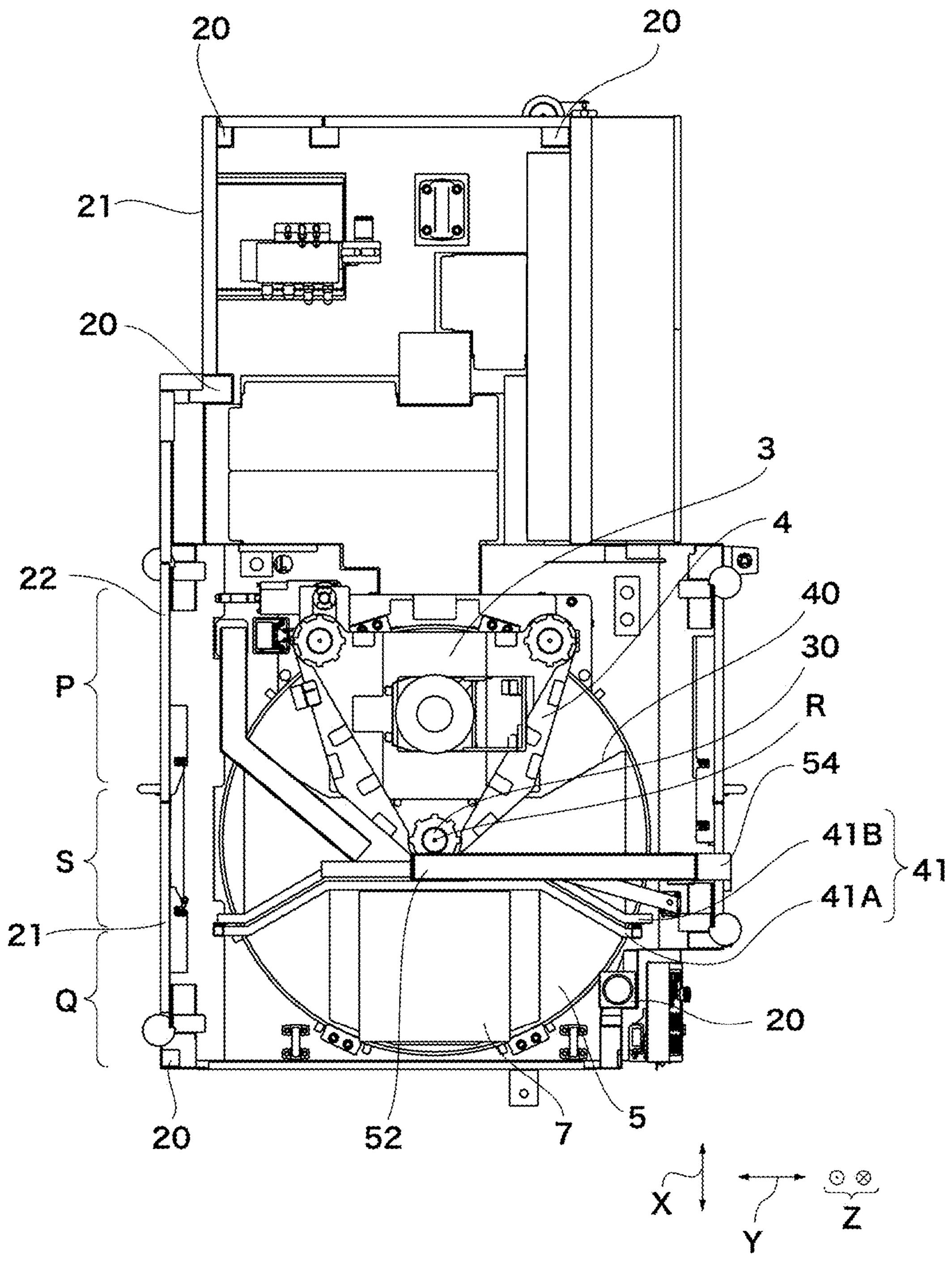

[FIG. 3]
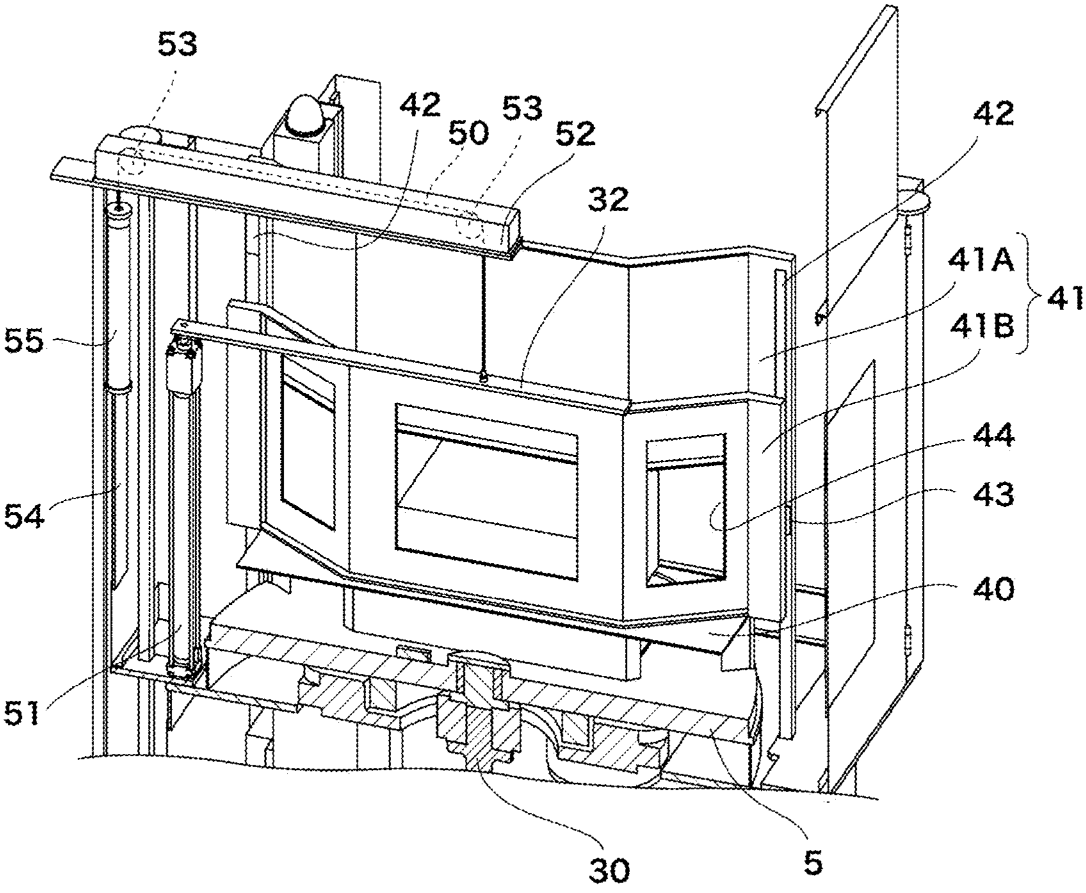

[FIG. 4]
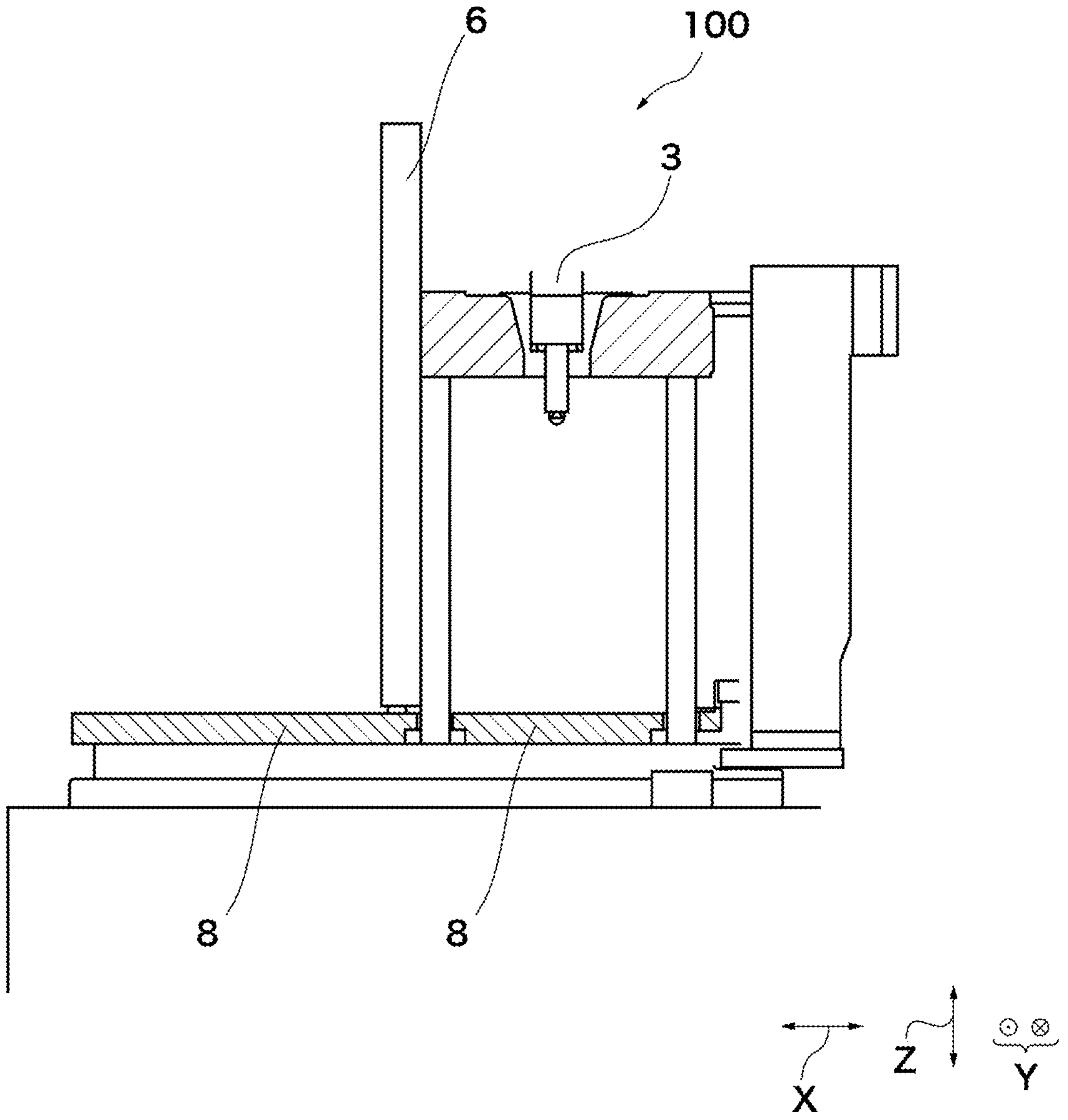

[FIG. 5]
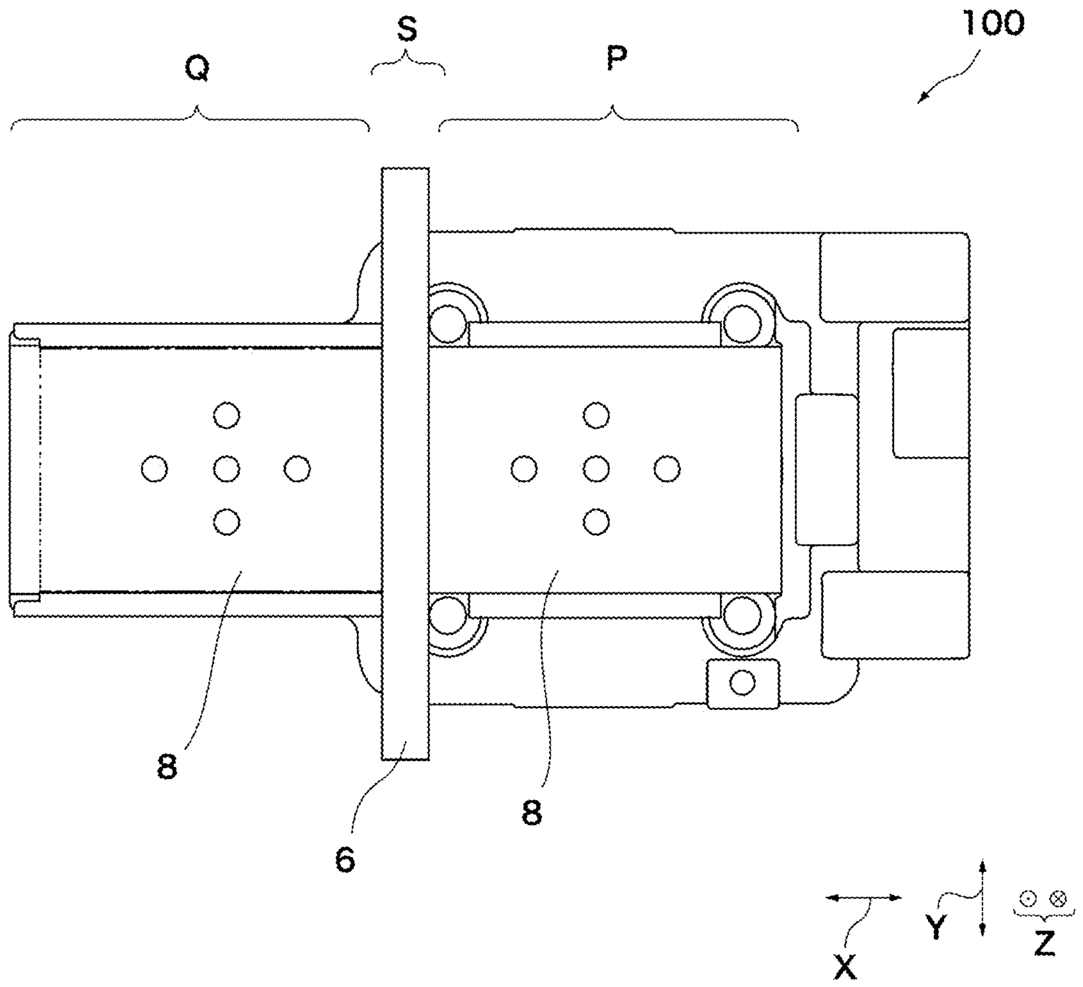

SAFETY COVER AND VERTICAL INJECTION MOLDING MACHINE

CROSS-REFERENCE TO RELATED APPLICATION

This application claims the priority benefit under 35 U.S.C. § 119 of Japanese Patent Application No. 2024-020628 filed on Feb. 14, 2024, which is hereby incorporated in its entirety by reference.

BACKGROUND OF THE INVENTION

Field of the Invention

The present invention relates to a safety cover for a vertical injection molding machine.

Description of Related Art

PTL 1 discloses a vertical injection molding machine including an injection device, a rotary table rotatably provided on a fixed plate, a lower mold placed on the rotary table, and a mold clamping device that includes an upper mold provided above the lower mold so that the upper mold can be moved in an up-down direction. The vertical injection molding machine includes a safety cover to prevent a part of an operator's body from getting caught in the molds during mold clamping.

The safety cover in PTL 1 includes a lower cover that is attached to the top surface of the rotary table so as to rotate with the rotary table, and an upper cover provided above the lower cover and fixed to a lower platen.

In a modification of PTL 1, the safety cover includes a lifting cover that moves up and down with an upper platen. The lifting cover includes a fixed cover that is fixed to the upper platen and protrudes downward from the upper platen, and a movable cover suspended from the fixed cover so as to be movable upward.

The safety cover in the related art is constituted of the lower cover that is fixed to the rotary table and the upper cover that is fixed to the lower platen. Accordingly, in the case of changing molds or adjusting and maintaining the clamping device, the upper cover must be attached to and detached from the lower platen, which causes a problem of poor maintainability.

Similarly, a safety cover according to the modification of the related art includes the fixed cover that is fixed to the upper platen and protrudes downward from the upper platen, and the movable cover that is suspended from the fixed cover so as to be movable upward. Accordingly, in the case of changing molds or adjusting and maintaining the clamping device, the fixed cover and the movable cover must be attached and detached, which causes the problem of poor maintainability.

In view of the foregoing, it is an object of the present invention to provide a safety cover with good maintainability and also to provide an injection molding machine including the safety cover.

BRIEF SUMMARY OF THE INVENTION

An aspect of the present invention relates to a safety cover included in a vertical injection molding machine that includes a frame, an injection device, and a mold clamping device, the safety cover including: a lower cover attached to an installation base where a lower mold is installed; and an upper cover provided above the lower cover, in which the upper cover includes a fixed cover that is fixed to the frame, a lifting cover that is attached to the fixed cover so as to be slidable in an up-down direction, and a holding device configured to hold the lifting cover in a predetermined position in the up-down direction, and the safety cover includes a lifting device configured to move the lifting cover up and down.

In the safety cover according to the aspect of the present invention, the fixed cover may have a guide groove formed so as to extend in the up-down direction, and a slider that moves along the guide groove may be attached to the lifting cover.

Another aspect of the present invention relates to an injection molding machine including the safety cover.

According to the present invention, the safety cover includes a lower cover attached to an installation base, and an upper cover provided above the lower cover, and the upper cover includes a fixed cover that is fixed to a frame, a lifting cover that is attached to the fixed cover so as to be slidable in an up-down direction, and a holding device configured to hold the lifting cover in a predetermined position in the up-down direction. Furthermore, the safety cover includes a lifting device configured to move the lifting cover up and down. Accordingly, in the case of changing the molds or adjusting and maintaining the mold clamping device, the lifting cover can be moved up so as to be retracted upward. This makes it possible to easily secure a work space for an operator and to provide the safety cover with good maintainability.

According to the present invention, the fixed cover may have a guide groove that extends in the up-down direction, and a slider that moves along the guide groove may be attached to the lifting cover. This makes it possible to smoothly slide the lifting cover and to provide the safe cover with good maintainability.

According to the present invention, since the injection molding machine includes the safety cover described above, it is possible to provide the injection molding machine including the safety cover with good maintainability.

BRIEF DESCRIPTION OF THE DRAWINGS

FIG. 1 is a perspective view illustrating the appearance of an injection molding machine.

FIG. 2 is a plan view of the injection molding machine.

FIG. 3 is a longitudinal cross-sectional view of an area around a safety cover 6 as viewed from the rear side.

FIG. 4 is a schematic side view illustrating a modification of the injection molding machine.

FIG. 5 is a schematic plan view illustrating the modification of the injection molding machine.

DETAILED DESCRIPTION OF THE INVENTION

FIG. 1 is a perspective view illustrating the appearance of an injection molding machine 1 according to an embodiment of the present invention. FIG. 2 is a plan view of the injection molding machine 1. In the following description, when the injection molding machine 1 is viewed from the front side, a front-rear direction is defined as an X direction, a left-right direction that is perpendicular and horizontal to the X direction is defined as a Y direction, and a vertical direction that is vertical to both the X and Y directions is defined as a Z direction.

The injection molding machine 1 includes a frame 2, an injection device 3, and a mold clamping device 4. The injection molding machine 1 is a vertical injection molding machine including the injection device 3 provided so as to extend in the Z direction.

The frame 2, which constitutes an outer shell of the injection molding machine 1, includes longitudinal frames 20 extending in the Z direction and wall members 21 provided between the longitudinal frames 20. The injection molding machine 1 also includes a safety door 22 adjacent to the wall members 21. The safety door 22 is provided on the injection device 3 in the Y direction as viewed from the front side. The safety door 22 is attached by hinges so as to be freely opened and closed to prevent an operator from entering a mold clamping region P.

The injection device 3 is a device configured to inject a molten resin into a cavity defined by an upper mold and a lower mold 7. The injection device 3 is provided in the mold clamping region P above a movable plate 5, which will be described later (see FIG. 2).

The mold clamping device 4 opens and closes the upper mold by moving an upper platen up and down, and clamps and holds the upper mold and the lower mold 7 so as to prevent the molds from opening due to the pressure of the injected resin. The mold clamping device 4 includes the upper platen to which the upper mold is attached and the movable plate 5 to which the lower mold 7 is attached. The upper platen is provided so as to be movable between a mold clamping position where the upper mold comes into contact with the lower mold 7 and a mold opening position that is an upper position where the upper mold is retracted.

The movable plate 5 is provided so as to be rotatable around a rotary axis R with a torque supplied from a drive source. At the center of the movable plate 5, there is provided a central column 30 that extends in the Z direction. The movable plate 5 rotates around the rotary axis R with the central column 30 as an axis.

As illustrated in FIG. 2, the injection molding machine 1 has a take-out region Q positioned more toward one side (front) in the X direction relative to the central column 30, and the mold clamping region P positioned more toward the other side (rear) in the X direction relative to the take-out region Q. A safety cover 6 is provided in an intermediate region S defined between the take-out region Q and the mold clamping region P.

The safety cover 6 is a device that prevents the operator's body from entering into the mold clamping region P from the take-out region Q. Providing the safety cover 6 prevents the operator's body from entering the mold clamping region P and getting caught in the molds during mold clamping.

FIG. 3 is a longitudinal cross-sectional view of an area around the safety cover 6 as viewed from the rear side. The safety cover 6 includes lower covers 40 attached to the movable plate 5 that is an installation base where the lower mold 7 is installed. The safety cover 6 also includes an upper cover 41 provided above the lower covers 40.

The lower covers 40 are plate-shaped covers that erect from the movable plate 5 and then extend across the XY plane. The lower covers 40 are designed as a pair of identical covers, symmetrically arranged with respect to the central column 30, which serves as the axis. Therefore, even when the movable plate 5 rotates 180° from a position of 0°, one of the lower covers 40 still positions below the upper cover 41. Hence, even when the lower mold 7 installed on the movable plate 5 is moved from the mold clamping region P to the take-out region Q by rotation of 180°, one of the lower covers 40 is constantly placed below the upper cover 41.

The upper cover 41 is configured to include a fixed cover 41A that is fixed to the frame 2 and a lifting cover 41B that is attached to the fixed cover 41A so as to be slidable in the Z direction.

The fixed cover 41A is plate-shaped, with each end portion in the Y direction secured to the frame 2. A guide groove 42 with a recessed cross-section, extending in the Z direction, is formed at each end portion of the fixed cover 41A in the Y direction.

The lifting cover 41B is shaped identically to the fixed cover 41A, with sliders 43 attached to the respective end portions thereof in the Y direction. These sliders 43 are designed to fit into the corresponding guide grooves 42. The lifting cover 41B has a plurality of opening portions 44 that penetrate in its thickness direction. The opening portions 44 each have a transparent member fitted therein. Providing the opening portions 44 allows an operator to observe the mold clamping region P through the take-out region Q.

A flat bar 32 that extends in the Y direction is fixed to the lifting cover 41B. The flat bar 32 is connected to one end portion of a chain 50.

An air cylinder 51 with a locking mechanism is attached to the flat bar 32 at its proximal end portion. Herein, the locking mechanism serves as the holding device configured to hold the lifting cover 41B in a predetermined position in the Z direction. The air cylinder 51 moves up upon reception of air supplied from a supply source which is not illustrated. The air cylinder 51 also moves down by releasing air from a discharge valve. As the air cylinder 51 moves up and down, the flat bar 32 moves in the Z direction.

With the movement of the flat bar 32, the lifting cover 41B slides in the Z direction. The air supply to the air cylinder 51 and opening and closing of the discharge valve are performed on the basis of control signals from a control unit. Since the air cylinder 51 has the locking mechanism, the air pressure is controlled on the basis of the control signals, so that the position in the Z direction is fixed. The locking mechanism (which is also denoted by reference numeral 51) may be achieved by, for example, a solenoid valve for regulating the inflow/outflow of air within the air cylinder. The locking mechanism 51 corresponds to the holding device.

Above the fixed cover 41A, a lateral frame 52 extending in the Y direction is provided. Two rollers 53 are attached to the lateral frame 52 so as to be positioned apart from each other in the Y direction. The lateral frame 52 has, at its proximal end portion, a weight housing portion 54 that extends in the Z direction. The weight housing portion 54 is a rectangular prism-shaped or cylindrical-shaped hollow body, with a housing space formed therein for housing a balance weight 55.

The balance weight 55 is housed in the weight housing portion 54. In an upper lid portion of the weight housing portion 54, an opening portion is formed for allowing insertion of the chain 50. One end portion of the chain 50 is connected to the flat bar 32 and is inserted into the opening portion via the two rollers 53, and the other end portion of the chain 50 is connected to the balance weight 55. When the balance weight 55 is connected, the lifting cover 41B can smoothly slide along the guide grooves 42.

Since the safety cover 6 has the configuration described above, the lifting cover 41B can be moved in the Z direction and be held in a desired position in the Z direction. Accordingly, in the case of changing the molds or adjusting and maintaining the mold clamping device 4, the lifting cover 41B can be moved up so as to be retracted upward.

When the height position of the lower mold 7 is changed due to change of the molds, the position of the lifting cover 41B in the Z direction can be adjusted to ensure that the take-out region Q is separated from the mold clamping region P. This makes it possible to easily secure the work space for an operator and to provide the safety cover 6 with good maintainability.

In addition, since the safety cover 6 has the guide grooves 42 and the sliders 43 that fit into the respective guide grooves 42, it is possible to smoothly slide the lifting cover 41B along the guide grooves 42 without causing rattling in each end portion in the Y direction. This configuration allows the lifting cover 41B to be accurately moved in the Z direction and be held in the desired position, so that the safety cover 6 with good maintainability can be provided. Since the injection molding machine 1 includes the safety cover 6, it is possible to implement the injection molding machine including the safety cover with good maintainability.

Although the lifting cover 41B is configured to slide by the air cylinder 51, which is the lifting device, in the present embodiment, the lifting cover 41B is not limited to this configuration. For example, the lifting cover 41B may be configured to be movable in the Z direction by moving the flat bar 32 using a pulley, a wire, and a winding machine, or the lifting cover 41B may have a locking mechanism so that the lifting cover 41B can be moved and held in a desired position by a lifting device using hydraulic pressure.

FIG. 4 is a schematic side view illustrating a modification of the injection molding machine, and FIG. 5 is a schematic plan view illustrating the modification of the injection molding machine. In the embodiment described above, the injection molding machine 1 includes the movable plate 5 as the installation base; however, the injection molding machine 1 is not limited to this configuration.

An injection molding machine 100 includes an installation base 8. As illustrated in FIGS. 4 and 5, the safety cover 6 is installed in the intermediate region S defined between the mold clamping region P and the take-out region Q. Since the configuration of the safety cover 6 is the same as that in the injection molding machine 1, a description thereof will be omitted.

The installation base 8 is configured to be slidable in the X direction. The installation base 8 can move from the mold clamping region P to the take-out region Q through the intermediate region S. The safety cover 6 can also be used in the injection molding machine including such a slidable installation base 8 like that in the injection molding machine 100.

REFERENCES SIGNS LIST

1 injection molding machine
2 frame
3 injection device
4 mold clamping device
5 movable plate
6 safety cover
7 lower mold
8 installation base
32 flat bar
40 lower cover
41 upper cover
41A fixed cover
41B lifting cover
42 guide groove
43 slider
50 chain
51 air cylinder
P mold clamping region
Q take-out region
S intermediate region
100 injection molding machine

CITATION LIST

Patent Literature 1: Japanese Patent Application Laid-Open No. 2019-177683

What is claimed is:

1. A safety cover included in a vertical injection molding machine that includes a frame, an injection device, and a mold clamping device, the safety cover comprising: a lower cover attached to an installation base where a lower mold is installed; and an upper cover provided above the lower cover, wherein:

the upper cover includes a fixed cover that is fixed to the frame, a lifting cover that is attached to the fixed cover so as to be movable in an up-down direction, and a holding device configured to hold the lifting cover in a predetermined position in the up-down direction; and the safety cover comprises a lifting device configured to move the lifting cover up and down.

2. The safety cover according to claim 1, wherein:

the fixed cover has a guide groove formed so as to extend in the up-down direction; and a slider that moves along the guide groove is attached to the lifting cover.

3. An injection molding machine comprising the safety cover according to claim 1.

4. An injection molding machine comprising the safety cover according to claim 2.

* * * * *